Patented May 14, 1929.

1,712,830

UNITED STATES PATENT OFFICE.

LUCAS P. KYRIDES, OF BUFFALO, NEW YORK, ASSIGNOR TO NATIONAL ANILINE & CHEMICAL COMPANY, INC., OF NEW YORK, N. Y., A CORPORATION OF NEW YORK.

ALKALI-METAL ALCOHOLATES.

No Drawing.   Application filed October 20, 1923. Serial No. 669,856.

This invention relates to improvements in the production of anhydrous alkali metal alcoholates, and more particularly to the production of water-free solutions or suspensions of anhydrous alkali metal alcoholates.

The anhydrous alkali metal alcoholates have been almost invariably heretofore prepared by the action of alkali metals (e. g., sodium) on water-free alcohols (e. g., absolute ethyl alcohol) in the presence or absence of an indifferent or inert solvent or diluent (e. g., ether, ligroin, benzene, xylene, etc.).

It is well known that alcoholic solutions of caustic soda or caustic potash upon evaporation give products of variable composition consisting of caustic alkali in combination with varying amounts of alcohol or water, or both. It has also been proposed to dehydrate such alcoholic solutions by treating them with calcium carbide, or a mixture of calcium carbide and lime, and to isolate the anhydrous alkali metal alcoholate in the dry state, if so desired, by evaporating the filtered dehydrated alcoholic solution to dryness with exclusion of air in a vacuum or in a current of an indifferent gas.

According to the present invention, anhydrous alkali metal alcoholates are produced by dehydrating alcoholic solutions (with the exception of methyl alcohol), of caustic alkalies by distilling them in the presence of liquids which form with water, or water and alcohol, an azeotropic mixture having a boiling point lower than any of the single components or lower than any mixture of any two of them.

In the case of some of the higher alcohols, such as normal butyl alcohol, which form with water azeotropic binary mixtures which boil somewhat below, say 5° or more, the boiling point of the pure, anhydrous alcohol itself, an excess of the alcohol may be used as the dehydrating liquid. For example, on distilling a normal butyl alcoholic solution of potassium hydroxide the water is carried over with some of the alcohol in the first part of the distillate as an alcohol-water-binary-azeotropic mixture and an anhydrous butyl alcoholic solution of potassium butylate is left in the still.

Other alcohols, such as for example ethyl alcohol, are best treated by adding an inert, indifferent liquid which forms azeotropic mixtures with water, alcohol, or both. I have found that hydrocarbons such as hexane, benzene and its homologues, etc., are particularly suitable, but the invention is not limited thereto and includes the use of any suitable liquid having the required properties whether the liquid is an excess of the alcohol itself or an added diluent.

Benzene forms an azeotropic binary mixture with water or with ethyl alcohol, propyl alcohol, isopropyl alcohol, isobutyl alcohol or tertiary butyl alcohol, and the binary mixture boils at a temperature lower than any single component. Benzene also forms an azeotropic ternary mixture with water and ethyl alcohol, propyl alcohol, isopropyl alcohol or tertiary butyl alcohol, and the ternary mixture boils at a temperature lower than any single one of the three components or lower than any mixture of any two of them. In an analogous manner, other hydrocarbons such as n-hexane, toluene, xylene, etc. form low boiling point binary azeotropic mixtures separately with water and with alcohols, and ternary azeotropic mixtures with water and alcohols.

In carrying out the invention, when a hydrocarbon is used to eliminate the water, a sufficient quantity of benzene, or other suitable hydrocarbon or chemically inert liquid, is added to the alcoholic solution of the alkali metal hydroxide to form the lowest boiling azeotropic mixture with the whole of the water present, that is, with all of the water present as such or as hydrate, together with all of the water formed in the production of the alcoholate by the action of the caustic alkali on the alcohol. This azeotropic mixture is usually a ternary mixture composed of alcohol, water and the hydrocarbon, but in some instances, for example in making the alkali metal alcoholates of certain secondary alcohols, such as secondary butyl alcohol, it is a binary mixture with the hydrocarbon and water as components. On distillation in a suitable still having an efficient still-head, this azeotropic mixture is separated from the mixture in the still by suitable fractionation. For the best results, it is advantageous that the mixture in the still be well agitated during the distillation, that the hydrocarbon be gradually added, or successively added, in portions and in such amounts that the caustic alkali is not precipitated from solution, and that the rate of distillation be so regulated that the temperature of the distillate passing from the still-head to the receiver be maintained at or near the boiling point of each azeotropic mixture until substantially all, or nearly all, of it has passed over; and, subsequently, to maintain the temperature during distillation for some time at the boiling point of the pure alcohol itself.

Further, the presence of an excess of benzene or other suitable accessory liquid over and above that necessary to form the azeotropic mixture of which water is one component is preferred in order to insure complete removal of the water, since its presence has no disadvantageous effects, as it may be subsequently removed by fractionation either as such or as an azeotropic mixture or by other suitable means.

If desired, types of apparatus may be used which permit a more or less continuous method of distillation in which the same, or nearly the same, quantity of accessory liquid serves to cause the separation of the water from the alcoholic alkali solution.

In case a hydrocarbon or other suitable accessory liquid is not used to remove the water, the alcoholic solution of the caustic alkali is subjected as such to distillation and the binary alcohol-water azeotropic mixture removed by suitable fractionation whereby an anhydrous alcoholic solution or admixture of the alkali metal alcoholate remains in the residue.

The following examples will further illustrate the invention, but it is understood that the invention is not limited thereto.

*Example 1.*—A well-stirred mixture of 21.7 kgs. sodium hydroxide (flake) dissolved in 350 liters of denatured alcohol (United States Internal Revenue, Regulations No. 30, revised, formula No. 2$^b$), and admixed with 100 liters benzene, is heated and subjected to careful fractional distillation in a fractional distillation apparatus or device having an efficient still-head or column. At first a turbid ternary mixture having a constant, or nearly constant boiling point (64.5–65°), and composed of water, alcohol and benzene, passes over into the receiver. After about 50 liters of the mixture is distilled off, 350 liters more benzene is added to the mixture being distilled. This is added gradually or successively, and at such a rate that the hydroxide remains in solution, and the boiling point of the ternary mixture is practically maintained until all, or nearly all, of the water has passed over into the receiver in the ternary mixture. At about this point, the distillate which passes over is no longer turbid and the temperature rises to the boiling point (about 68–68.5°) of the binary mixture (alcohol and benzene) which then comes over. When almost all, if not all, of the binary mixture has distilled off, the temperature again rises and ultimately reaches and remains at the boiling point of anhydrous alcohol (78.3°) and the residual liquor (about 125 liters) in the still comprises an anhydrous alcoholic solution of sodium alcoholate. This solution may be used directly for condensations such as, for example, the preparation of oxalacetic ester, etc.

Traces of water are present until the boiling point of the alcohol-benzene binary mixture becomes and remains constant for some considerable time. This constancy of the boiling is evidence of the absence of water in the vapors. If the boiling point is not constant at this point, more dry benzene must be added and the distillation continued.

It has been found advantageous, and therefore preferable, to always have sufficient alcohol present to keep the caustic alkali as well as the alkali metal alcoholate in solution during the process of dehydration. For that reason sufficient alcohol should be taken at the outset to maintain this condition, otherwise the addition of more alcohol becomes advisable, which consequently lengthens the time of operation since the fresh alcohol which is added must be dehydrated. After beginning the process of distillation the addition of extra alcohol should therefore be avoided, if possible.

While it may be possible to carry over the whole of the water in the ternary mixture by the use of a very efficient still-head, yet in practice it has been found that the last traces of water are only slowly removed and that it is usually not until toward the end of the distillation of the binary alcoholic-benzene mixture that the solution becomes substantially anhydrous. This is probably due to the relatively small difference (e. g., about 3.4° C.) between the boiling points of the binary (alcohol-benzene) and the ternary (alcohol-benzene-water) mixtures. The more efficient the still-head, the slower the distillation, the purer the alcohol, and the larger the amount of benzene, the more efficient the dehydration will be.

In case a benzene suspension of the anhydrous sodium alcoholate is desired instead of the alcoholic solution, all of the alcohol may be distilled off as the benzene-alcohol binary mixture after the solution has been dehydrated by adding excess of benzene and continuing the distillation until the boiling point has risen to that of the hydrocarbon and maintained at that temperature for some time.

Practically all of the benzene and alcohol in the distillate, except a small amount lost by evaporation and handling, may be recovered by suitable and well-known methods.

By evaporating the solution or suspension containing the sodium alcoholate to dryness under suitable and well-known conditions, for example, with exclusion of air in a vacuum or in a current of an indifferent gas, such as hydrogen, at temperatures suitable for the elimination of any alcohol of crystallization which may be present, say about 200° C., the alcoholate may be obtained in the dry state.

*Example 2.*—A well-stirred mixture of 18 kgs. potassium hydroxide (84 per cent purity) dissolved in 150 liters of normal butyl alcohol, and admixed with 60 liters toluene, is heated and subjected to careful fractional distillation in a suitable still provided with an efficient still-head or column. Most, if not all, of the water is carried over in the first part of the distillate, apparently as a ternary azeotropic mixture of normal butyl alcohol, toluene, and water boiling around 83–86° C. The temperature of the vapors soon rises to about 105–106° C. and a binary mixture (alcohol-toluene) distils over, which is later followed by a further rise of temperature to about 116–117° which is the boiling point of pure normal butyl alcohol. After the temperature has become constant, the contents of the still are allowed to cool. The residual liquor, comprising anhydrous normal butyl alcohol and potassium butylate, may be employed as such for use as a condensing reagent in many cases in place of alcoholic solutions of sodium ethylate as for example, in the preparation of alkylmalonic ester, benzylmalonic ester, oxalacetic ester, etc.

*Example 3.*—A well-stirred solution of 18 kgs. potassium hydroxide (84 per cent purity) in 150 liters of normal butyl alcohol is heated and subjected to careful fractional distillation in a still provided with an efficient still-head or column. At first, a binary azeotropic mixture of the alcohol and water distils over into the receiver at a temperature of about 92°–93° C. The distillation is regulated so as to maintain approximately this temperature until substantially no more, or very little, distillate passes over. Generally, this occurs when about 16–18 liters of distillate have been obtained. The temperature is then slowly raised until it reaches and becomes constant at the boiling point (about 117° C.) of pure normal butyl alcohol. This occurs when about 25–50 liters of total distillate have been recovered. The residue in the still comprises an anhydrous normal butyl alcohol solution of potassium butylate. It is allowed to cool and may be employed as such or the potassium butylate may be isolated and recovered by any well known suitable process.

The present invention is applicable to the preparation of anhydrous alcoholates of the alkali metals from alcohols having not less than (2) carbon atoms in their composition and in which caustic alkalies may be dissolved and the solution boiled without undergoing decomposition and without thereby giving rise to other chemical products, such as complex condensation products, aldehydes, tars, etc. The invention is particularly applicable to the preparation of the anhydrous alkali metal alcoholates of the monohydric aliphatic alcohols, excepting methyl alcohol and throughout the specification and claims it will be understood that the term "alcohol" or "alcoholic" does not include methyl alcohol within the meaning of said term or terms.

The invention has the great advantage of employing the cheaper alkali metal hydroxides in place of the expensive alkali metals.

In case benzene or other suitable hydrocarbon forms no ternary azeotropic mixture with the alcohol and water, then the water may be removed by the formation of the binary mixture of hydrocarbon and water, for example, benzene and water which boils at about 69.25° C. And if the hydrocarbon, such as benzene, forms no binary azeotropic mixture with the alcohol, then it may be separated subsequently from the alcohol by direct fractionation.

While the invention is applicable to the use of denatured alcohol and to commercial alcohols containing considerable percentages of water, such as commercial ethyl alcohol which usually contains about 5 per cent water, yet it may be pointed out that the drier the initial alcohol the easier the dehydration is effected.

It is to be understood that the scope of the invention is not limited to the specific proportions and conditions given for illustration purposes, as they are intended to be only approximate and sufficiently accurate to enable the process to be practiced. Further, in so far as the present invention is concerned, dehydration may be effected under any pressure so long as low-boiling azeotropic mixtures of the ingredients are formed.

It will be understood that the term "caustic alkali" includes the oxides of the alkali metals as well as the hydroxides.

I claim:

1. The method of preparing alkali metal alcoholates from caustic alkalies, which comprises fractionally distilling a solution of the caustic alkali in an alcohol containing at least two carbon atoms in the presence of a sufficient amount of a liquid which forms a minimum boiling-point azeotropic mixture including all the water, whereby the azeotropic mixture is removed and a solution of the alkali metal alcoholate remains in the still.

2. The method of preparing alkali metal alcoholates from alkali metal hydroxides, which comprises fractionally distilling a solution of the alkali metal hydroxide in an alcohol containing at least two carbon atoms in the presence of a sufficient amount of a liquid which forms a minimum boiling-point azeotropic mixture including all the water, whereby the azeotropic mixture is removed and a solution of the alkali metal alcoholate remains in the still.

3. The method of preparing sodium alcoholates from sodium hydroxide, which comprises fractionally distilling a solution of the sodium hydroxide in an alcohol containing at least two carbon atoms in the presence of a sufficient amount of a liquid which forms a minimum boiling-point azeotropic mixture including all the water, whereby the azeotropic mixture is removed and a solution of the sodium alcoholate remains in the still.

4. The method of dehydrating alcoholic solutions of caustic alkali in an alcohol containing at least two carbon atoms and of producing alkali metal alcoholates, which comprises admixing therewith an inert liquid which forms an azeotropic mixture with water, the amount of inert liquid being at least sufficient to form a minimum boiling-point azeotropic mixture including all the water, and removing the azeotropic mixture by fractional distillation.

5. The method of dehydrating an alcoholic solution of caustic alkali in an alcohol containing at least two carbon atoms and of producing alkali metal alcoholates, which comprises admixing therewith a hydrocarbon which forms an azeotropic mixture with water, the amount of hydrocarbon being at least sufficient to form a minimum boiling-point azeotropic mixture with all the water as one of the components, and distilling off the azeotropic mixture.

6. The method of dehydrating an alcoholic solution of caustic alkali in an alcohol containing at least two carbon atoms and of producing alkali metal alcoholates, which comprises adding thereto an aromatic hydrocarbon which forms an azeotropic mixture with water, the amount thereof being such that all of the water and a part of the alcohol will be included in low boiling-point mixtures with the aromatic hydrocarbon, and removing the low boiling-point mixtures by distillation.

7. The method of dehydrating an alcoholic solution of an alkali metal alcoholate in an alcohol containing at least two carbon atoms when in admixture with water and of producing anhydrous alkali metal alcoholate, which comprises adding benzene thereto, the amount of benzene being in excess of that required to form minimum boiling-point azeotropic mixtures including all the water, and fractionally distilling the mixture to remove the azeotropic mixtures.

8. The method of making an anhydrous ethyl alcoholic solution of sodium ethylate, which comprises dissolving solid sodium hydroxide in an excess of the alcohol, adding benzene thereto in an amount sufficient to form a low boiling-point ternary azeotropic mixture with all of the water present and a part of the alcohol and to form a low boiling-point binary mixture with a portion of the alcohol and distilling the mixture to remove the ternary and binary mixtures.

9. The method of producing anhydrous alkali metal alcoholates, which comprises dissolving a caustic alkali in an excess of an alcohol containing at least two carbon atoms, adding thereto a hydrocarbon of a character and in an amount at least sufficient to form a minimum boiling-point azeotropic mixture including all the water, removing the azeotropic mixture by distillation, and subsequently evaporating the dehydrated alcoholic solution to dryness under diminished pressure in a current of an indifferent gas.

10. The method of producing anhydrous alkali metal alcoholates, which comprises dissolving a caustic alkali in an excess of an alcohol containing at least two carbon atoms, adding benzene thereto in an amount at least sufficient to form a minimum boiling-point azeotropic mixture with all of the water and a part of the alcohol, distilling off the azeotropic mixture, subsequently adding benzene in excess of the amount sufficient to form a minimum boiling-point azeotropic mixture with all of the remaining alcohol, and removing the benzene-alcohol azeotropic mixture by distillation.

11. The method of dehydrating an ethanol solution of caustic alkali to produce anhydrous alkali metal ethylate, which comprises admixing therewith a sufficient amount of inert liquid which forms a minimum boiling-point azeotropic mixture including all the water, and distilling off the azeotropic mixture.

12. The method of dehydrating an ethanol solution of caustic alkali to produce anhydrous alkali metal ethylate, which comprises admixing therewith a sufficient amount of benzene to form a minimum boiling-point azeotropic mixture with all of the water as one of the components, and distilling off the azeotropic mixture.

13. The method of preparing an anhydrous ethanol solution of alkali metal ethylate, which comprises admixing therewith benzene, the amount of benzene being in excess of that necessary to form a minimum boiling-point azeotropic mixture with all of the water as one of the components, and distilling off the azeotropic mixture.

In testimony whereof I affix my signature.

LUCAS P. KYRIDES.